United States Patent [19]

Deak

[11] Patent Number: 5,328,724
[45] Date of Patent: Jul. 12, 1994

[54] SOLUTION COATING PROCESS FOR PACKAGING FILM

[75] Inventor: Gedeon I. Deak, Wilmington, Del.

[73] Assignee: E. I. Du Pont de Nemours and Company, Wilmington, Del.

[21] Appl. No.: 113,982

[22] Filed: Sep. 2, 1993

[51] Int. Cl.$^5$ .............................................. B05D 7/02
[52] U.S. Cl. ................... 427/391; 427/393.5
[58] Field of Search ........................ 427/393.5, 391

[56] References Cited

U.S. PATENT DOCUMENTS

| | | | |
|---|---|---|---|
| 3,419,654 | 12/1968 | Chiba et al. | 264/210 |
| 3,595,740 | 7/1971 | Gerow | 161/254 |
| 3,931,449 | 1/1976 | Hirata et al. | 428/474 |
| 4,513,058 | 4/1985 | Martin | 428/336 |
| 4,534,930 | 8/1985 | Nohara | 264/513 |
| 4,604,446 | 8/1986 | Sand et al. | 528/173 |
| 4,990,562 | 2/1991 | Chou et al. | 525/58 |
| 5,053,257 | 10/1991 | Hasegawa et al. | 427/379 |
| 5,134,036 | 7/1992 | Uemura et al. | 428/516 |

FOREIGN PATENT DOCUMENTS

| | | |
|---|---|---|
| 0203459 | 12/1986 | European Pat. Off. |
| 56-136825 | 10/1981 | Japan . |
| 04190836 | 11/1990 | Japan . |

OTHER PUBLICATIONS

Schaper, Tappi Journal, Oct. 1989, pp. 127–131, Ethylene Vinyl Alcohol Copolymer Resins for Better Solvent, Aroma and Flavor Barriers.

R. Endo, A. Goto, H. Okano and H. Arai, Solution Behavior of [(Ethylene-co-Vinyl Alcohol)-g-Ethylene Oxide] Graft Copolymers, *Journal of Polymer Science, Polymer Physics Edition*, 17, 645–654, 1979.

K. Nakamae, T. Ochiumi, M. Kameyama and T. Matsumoto, Solubility and Particle Precipitation of Ethylene-Vinyl Alcohol Copolymer, *Kobunshi Ronbunshu*, 45, No. 1:11–177, 1988.

*Primary Examiner*—Terry J. Owens
*Assistant Examiner*—Erma Cameron
*Attorney, Agent, or Firm*—Konrad S. Kaeding

[57] ABSTRACT

A process for applying a barrier layer of ethylene/vinyl alcohol copolymer (EVOH) to a substrate, such as a plastic film, by coating the substrate with a solution of EVOH in a solvent of tetrahydrofuran and water, followed by removing the solvent. Multilayer structures having an EVOH barrier layer coated on a plastic substrate from solution in aqueous tetrahydrofuran solvent have excellent oxygen barrier properties.

5 Claims, 1 Drawing Sheet

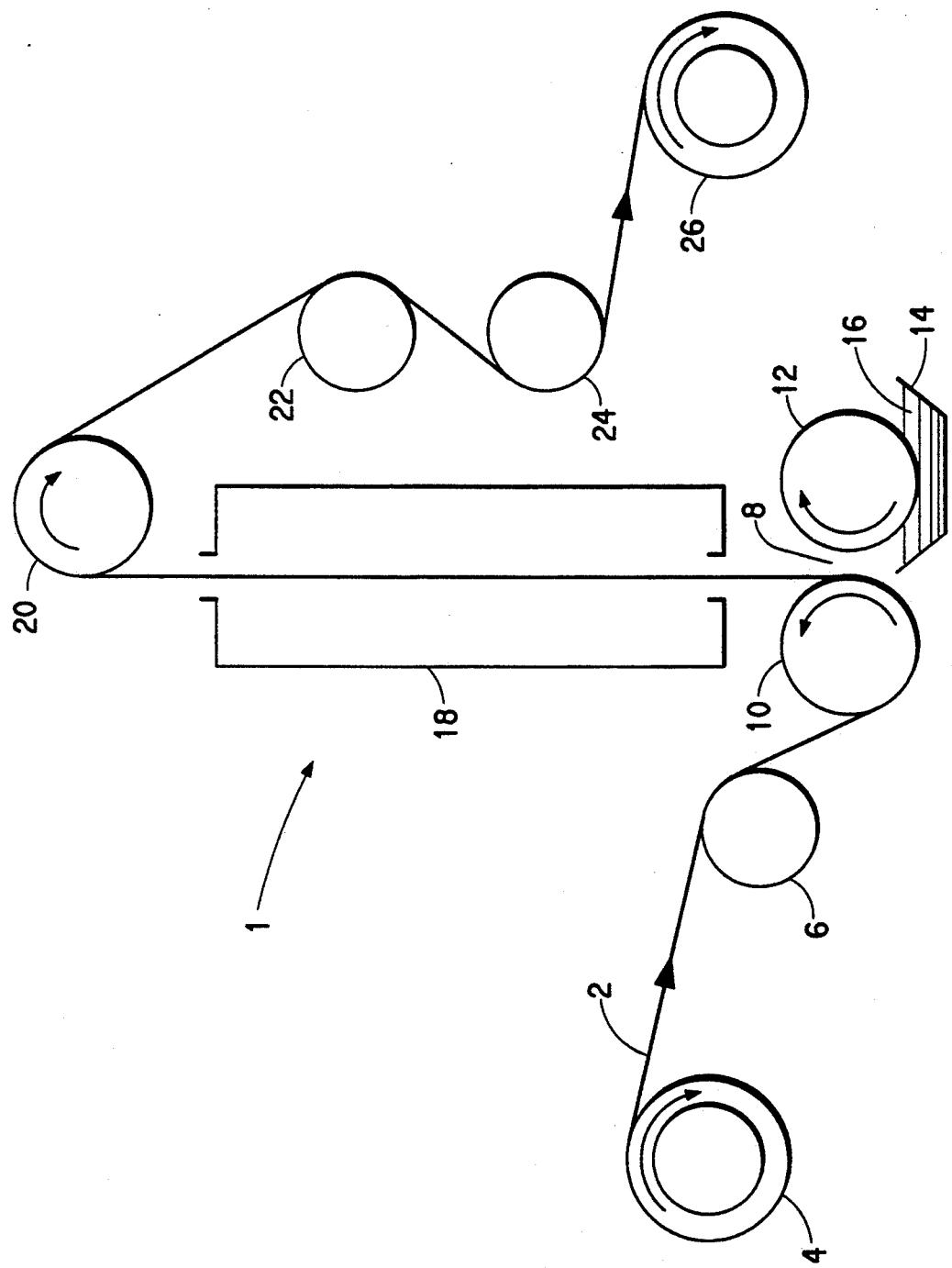

SOLUTION COATING PROCESS FOR PACKAGING FILM

BACKGROUND OF THE INVENTION

The present invention relates to solution coating barrier layers on plastic films.

The gas permeability of certain plastic articles, such as films, can be reduced by coating the article with a barrier material. Ethylene/vinyl alcohol copolymer (EVOH) is recognized as a barrier material which is especially good for reducing the permeability to oxygen. By coating plastic with an EVOH layer it is possible to make clear, strong film which is well suited for packaging oxygen-sensitive products such as food and chemicals.

One of many methods to apply polymer coatings to substrates is solution coating. Typically in such process, the coating material is dissolved in a convenient solvent, the solution is deposited on the film surface and thereafter the solvent is removed. Solution coating is advantageous for placing very thin coatings on sheets, films and substrates which have complex shapes such as containers. Generally, alcohols, and mixtures of alcohols with water, are preferred solvents for solution coating substrates with EVOH because they are inexpensive and have moderately low toxicity. Solutions of EVOH in alcohols, however, tend to gel or precipitate after short-term aging. Consequently, they have only limited shelf life. Furthermore, alcohol-based solutions of EVOH have high solution viscosities. Dilute solutions must be used in order to attain sufficiently low solution viscosity for proper coating process operation. Dilute solutions, however, are costly because of the large amount of solvent consumed and long drying time needed to remove the solvent. Use of dilute solutions is also environmentally unattractive because of the need to recover large quantities of spent solvent.

SUMMARY OF THE INVENTION

The present invention provides a process for solution coating barrier layers on substrates using concentrated, yet low viscosity and stable EVOH solutions in solvent of tetrahydrofuran and water.

Specifically, there is now provided a process for solution coating a substrate with an ethylene/vinyl alcohol copolymer (EVOH) barrier, comprising the steps of:

(1) agitating a coating solution consisting essentially of
  (A) about 7 to about 20 wt % ethylene/vinyl alcohol copolymer having copolymerized ethylene content from about 20 to about 55 mole %; and
  (B) a complementary amount to total to 100 wt % of a solvent consisting essentially of about 10 to about 70 wt % water; and a complementary amount to total 100 wt % of tetrahydrofuran;

at a temperature within the range of about 55°-100° C. until a clear solution is obtained;

(2) coating at least one surface of the substrate with the coating solution; and (3) removing the solvent, whereby a dry ethylene/vinyl alcohol copolymer coating on the at least one surface is produced.

There is further provided a coating solution consisting essentially of:

(A) about 7 to about 20 wt % ethylene/vinyl alcohol copolymer having copolymerized ethylene content from about 20 to about 55 mole %; and (B) a complementary amount to total 100 wt % of a solvent consisting essentially of about 10 to about 70 wt % water; and a complementary amount to total 100 wt %, of tetrahydrofuran.

BRIEF DESCRIPTION OF THE DRAWINGS

The FIGURE is a side elevation view of a continuous, doctor roll coating system for solution coating one side of a film.

DESCRIPTION OF THE PREFERRED EMBODIMENTS

Definition: The term "consisting essentially of" means that other materials than ethylene/vinyl alcohol copolymer, tetrahydrofuran and water can be present in solution; provided that such other materials do not detract from the operability of the present invention.

The principal component of the solution of the present invention is ethylene/vinyl alcohol copolymer (EVOH). EVOH useful in this invention includes resins having a copolymerized ethylene content of about 20 to about 55 mole %, especially about 25 to about 50 mole %. Copolymers of higher than about 55 mole % ethylene tend to have reduced gas barrier performance. These copolymers will have a saponification degree of at least about 90%, preferably at least about 95%, and more preferably at least about 99%. A degree of saponification of less than about 90% results in inferior gas barrier properties. The EVOH may include as an optional comonomer other olefins such as, for example, propylene, 1-butene, 1-pentene and 4-methyl-1-pentene in such an amount as to not change the inherent properties of the copolymer, that is, usually in an amount of up to about 5 mole % based on the total copolymer. The melting points of these EVOH copolymers are generally between about 160° C. and 190° C.

EVOH copolymers are normally prepared by copolymerization of ethylene with vinyl acetate, followed by hydrolysis of the vinyl acetate component to give the vinyl alcohol group. This process is well known in the art.

The solvent for the solution of the present invention is a mixture of tetrahydrofuran (THF) and water. The composition of the solvent will depend in part on the ethylene content of the EVOH copolymer. Generally, as the fraction of copolymerized ethylene in the EVOH increases, less water should be used in the solvent. Preferred solvent composition is defined by formula (I):

$$65\text{-}E \leq H_2O \leq 90\text{-}E \qquad (1)$$

wherein
E = mole % copolymerized ethylene in the EVOH, and
$H_2O$ = wt % water in the THF/water binary of the solvent.

Formula (I) is approximate. Maximum and minimum water concentrations from about 5 wt % above, to about 5 wt % below, the concentration predicted by formula (I) may be suitable for use in the present invention. For example, for EVOH with 30 mole % ethylene content, formula (I) predicts acceptable solvent with water in the range of 35-60 wt %. Suitable minimum and maximum water concentrations may be in the ranges of about 30-40 wt % and about 55-65 wt %, respectively. Other factors which can influence the solvent concentration are molecular weight and degree of saponification of the EVOH. To the extent that the foregoing predictive formula is approximate, an ordinary skilled practitioner should be able to determine a proper solvent concentration with only little experimentation.

The order of adding ingredients to the solution is not important. In order to assure the concentration of the solvent, it is preferred to mix the water and THF first then add the EVOH to the liquid mixture. The solution is typically prepared by heating and agitating the ingredients for sufficient time to cause the EVOH to dissolve in the solvent. Duration of heating and extent of agitation will depend on such factors as the operating temperature, concentration of EVOH in solution and form of the EVOH copolymer. EVOH is typically available in form of pellets having maximum dimension of about 3–6 mm. It can be supplied in sheet and slab form which should preferably be comminuted to smaller particles to facilitate dissolving. Waste EVOH film can be recovered for solution coating according to this invention and should be shredded or ground to dissolve more quickly. Typically, the solution ingredients are heated and maintained at an elevated temperature, preferably the solution boiling point, in an agitated vessel until the copolymer has dissolved. Evaporated solvent is condensed and refluxed. If a lower temperature is employed, dissolving will take longer. Preferably, the ingredients should be heated to a temperature of at least 60° C. and, more preferably, to a temperature of at least 65° C. The atmospheric boiling points of THF/water solutions of this invention are about 67° C. It is possible to increase the rate of solution by further elevating the temperature. This could be accomplished, for example, by dissolving in a closed system under pressure. The solution should not be heated to such a high temperature that the EVOH thermally degrades. Ordinarily, dissolution should be fast enough for industrial purpose if the dissolution temperature does not exceed 100° C.

The coating solutions of the present invention preferably contain about 8 to about 14 wt % EVOH, and more preferably about 8 to about 12 wt % EVOH. Generally, higher EVOH concentrations produce higher solution viscosities at given temperature and EVOH molecular weight. Consequently, EVOH concentrations higher than about 20 wt % are usually too viscous for application by conventional solution coating equipment and processes. Solutions having less than about 7 wt % EVOH are commercially unattractive because of the cost of excess solvent; the equipment needed to recover excess solvent; and the tendency to produce excessively hazy and blistered coatings when large volumes of solvent are removed too quickly from wet coatings at commercially preferred drying rates.

After the solids have been dissolved, the solution can be brought to ambient temperature, either by cooling the solution or by simply removing the source of heat. Alternatively, the solution can be coated onto a substrate at elevated temperature.

Solutions prepared in accordance with the present invention are typically stable, i.e., they will not gel or precipitate, for at least several days. Agitation can be stopped as soon as the EVOH is dissolved. The coating solution can be transferred to storage facilities or can be used directly after preparation.

Solutions of this invention can be coated onto substrates by any of the processes well known in the art such as dip coating, knife coating, gravure coating and roll coating. These solutions should find acceptance in coating processes for which low viscosity is important, such as for example, spray coating. Normally, the solution is applied to a surface of a substrate and the solvent is removed. Solvent removal, sometimes hereinafter referred to as drying, can be achieved by subjecting the wet, coated film to high temperature, vacuum or a combination of these for a sufficient time to cause the solvent to evaporate. Preferably drying is accomplished by subjecting the wet-coated substrate to elevated temperature, however, the temperature should not be high enough to degrade the film.

The dry coating can be produced by a single application of the solution to the substrate or, primarily when thicker coatings are desired, the coating thickness can be built up by repeated applications of solution followed by solvent removal. Although the dried, coated films made by the process of the present invention can be heat treated as is sometimes practiced in the art, it is not necessary to perform such heat treatment to achieve beneficial properties.

Coating solutions according to the present invention can also include other additives, such as for example, slip additives, which improve the ease of applying the coating solutions to substrates. Some slip additives are organic and may dissolve in the solvent. Normally, slip additives are insoluble inorganic compounds. A preferred slip additive is a mineral mixture now or formerly available from Pfizer Minerals under the tradename of Talcron ® and believed to consist of 61wt % $SiO_2$, 31 wt % MgO and the remainder other metal oxides. When insoluble additives are used, they can be charged to the agitated solution where they remain in suspension until the coating solution is applied to the substrate. Insoluble additives should be of sufficiently small particle size to resist settling from suspension after agitation is stopped. If suspensions do settle, they can be easily redispersed by further agitation.

The substrate to which solutions of the present invention can be applied are preferably plastics, such as polyester, including for example polyethylene terephthalate; polyamides, including for example, poly(hexamethylene adipamide) or nylon 6,6, poly(ε-caprolactam) or nylon 6, poly(hexamethylene terephthalamide), nylon 11, nylon 12, and nylon 12,12; cellulosics such as regenerated cellulosic film and paper, for example; and metal. Such substrates may themselves be multilayer composites which include metal or inorganic chemical coatings. EVOH solutions of the present invention can also be applied over adhesive layers, typically known in the industry as "tie layers", for improving the bond between substrate and the EVOH.

EVOH-coated substrates made according to the process of the present invention can be used in packaging applications where a barrier to oxygen is important. Such applications include packaging of oxygen-sensitive materials, such as chemicals, and foods, such as for example, coffee, chocolate, processed meat, cheese, and pet food.

EXAMPLES

This invention is now illustrated by representative examples of certain preferred embodiments thereof, where all parts, proportions, and percentages are by weight, unless otherwise indicated. All units of weight and measure other than SI units have been converted to SI units. Unless otherwise noted, oxygen transmission rate and permeability value in the examples were measured at 30° C.

EXAMPLES 1-7 AND COMPARATIVE EXAMPLES C1-C8

In each example, 50 g of fully hydrolyzed, ethylene/vinyl alcohol copolymer was dissolved in 450 g of solvent of deionized water and cosolvent. The EVOH had either 30 mol % ethylene content, and melt flow of 9 dg/min. at 210° C. measured according to ASTM Standard D-1238, or 44 mol % ethylene content and melt flow of 16. The solvent was agitated in a 1 L resin kettle at room temperature while EVOH pellets were charged. The mixture was then gradually heated to boiling and maintained at boiling with agitation for 2 hours. Thereafter, while agitation was maintained, heat was removed which allowed the solution to cool to room temperature, i.e., 19°-21° C., overnight. Viscosity of the solution was measured with a model LV, Brookfield viscometer. The solution was stored at room temperature in closed jars without agitation and appearance was determined periodically by visual inspection. Formation of dispersion was readily observed by loss of clarity and deposition of particles on the wall of the jar. Shelf life was the number of storage days until dispersion was observed.

Operating conditions and results are summarized in Table I. THF composition in solvent was generally from about 45 wt % to about 70 wt % and the upper and lower limits depended slightly on composition of the EVOH. Viscosities of the operative examples were consistently lower than those of solutions with isopropyl alcohol cosolvent, which is recognized in the art as a solvent for EVOH. Shelf life of the THF/water solutions were also longer than the isopropyl alcohol cosolvent examples.

EXAMPLES 8-11 AND COMPARATIVE EXAMPLE C9

EVOH/THF/Water solutions were prepared using the materials and procedures of Example 1. Proportions of ingredients and results of tests described below are summarized in Table II. After the solutions had cooled to room temperature, they were cast onto 23 μm thick, polyethylene terephthalate (PET) film, using a coating knife with a 100 μm gap. Within about 10 seconds of coating, the films were placed for 1 minute in a convection oven at 100° C. to dry. Haze value was measured with a HunterLab ColorQuest Sphere Spectrocolorimeter (version 3.2).

TABLE II

| Example No. | Ethylene in EVOH W % | Wt % EVOH in Solution | Co-Solvent | Wt % Water in Solvent | Coating g/m² | Thickness μm | Haze % |
|---|---|---|---|---|---|---|---|
| 8 | 30 | 8 | THF | 35 | 7.4 | 6.2 | 13.3 |
| 9 | 30 | 10 | THF | 35 | 2.1 | 1.8 | 12.0 |
| 10 | 30 | 12 | THF | 35 | 7.1 | 5.9 | 11.0 |
| 11 | 30 | 14 | THF | 35 | 3.8 | 3.2 | 11.4 |
| C9 | 30 | 6 | THF | 35 | 1.2 | 1.0 | 64.4 |

EXAMPLE 12

An EVOH copolymer of 30 mol % ethylene and 37 dg/min. melt flow was prepared to provide low viscosity in solution. A 10.5% solids solution was made by dissolving 50 g of this copolymer in a mixture of 200 g THF and 225 g deionized water in the manner of Example 1. The solution was cast onto a 23 μm thick PET film as in Example 8 to produce a 2.1 μm dried coating thickness which exhibited excellent clarity and appearance.

Oxygen permeability of the coated film was measured at both 35% and 80% relative humidity as 9 and 29 mL/m².day.atm, respectively. After correction for the known oxygen permeability of uncoated PET film (i.e., 70 mL/m².day.atm) and film thickness were made, the oxygen permeability of the unit thickness EVOH layer was calculated as 10 and 113 mL.μm/m².day.atm at 35% and 80% relative humidity, respectively. Such values are considered excellent at 30° C.

TABLE I

| Example No. | Ethylene in EVOH Wt % | Wt % EVOH in Solution | Co-Solvent | Wt % Water in Solvent | Brookfield Viscosity Pa·s | Shelf life Days |
|---|---|---|---|---|---|---|
| 1 | 30 | 10 | THF | 53 | 0.131 | 5-15 |
| 2 | 30 | 10 | THF | 43 | 0.123 | 10-20 |
| 3 | 30 | 10 | THF | 38 | 0.145 | 10-20 |
| 4 | 30 | 10 | THF | 38 | 0.125 | 10-20 |
| C1 | 30 | 10 | THF | 72 | * | 0 |
| C2 | 30 | 10 | THF | 63 | * | 0 |
| C3 | 30 | 10 | THF | 33 | * | 0 |
| C4 | 30 | 10 | IPA | 45 | 0.202 | 1-2 |
| C5 | 30 | 10 | IPA | 55 | 0.218 | 1-2 |
| 5 | 44 | 10 | THF | 25 | 0.141 | 3-5 |
| 6 | 44 | 10 | THF | 33 | — | 3-5 |
| 7 | 44 | 10 | THF | 40 | 0.158 | 2-4 |
| C5 | 44 | 10 | THF | 15 | ** | 0 |
| C6 | 44 | 10 | THF | 50 | ** | 0 |
| C7 | 44 | 10 | IPA | 33 | ** | 0 |
| C8 | 44 | 10 | IPA | 45 | ** | 0 |

* = Formed Two Phases
** = Gelled

EXAMPLE 13

The procedure of Example 5 was repeated using 50 g of EVOH copolymer with 44 mole % copolymerized ethylene content and melt flow of 16 dg/min., to make a 10 wt % solids solution in 75 wt % THF/25 wt % water solvent. The solution, which remained clear after cooling to room temperature, was cast onto 23 μm thick, PET film with a 50 μm gap coating knife, then dried in a 110° C. oven for 2 minutes to form a dried coating of 1.75 μm thickness. Oxygen permeability for the coated film was measured as 27 and 39 mL/m².day.atm at 44% and 80% relative humidity, respectively.

EXAMPLES 14–16 AND COMPARATIVE EXAMPLES C10–C12

Coating solutions of the EVOH of Example 1 were prepared in 62 wt % THF/38 wt % water solvent. A 9.7 wt % solids solution ("solution A") was made by adding 247.7 g EVOH to 1625 mL THF and 875 mL water in an agitated 4 L resin kettle. The mixture was heated to boiling and after the polymer had dissolved, 2.3 g of Pfizer Minerals Talcron ® additive was charged then the solution was cooled to room temperature (about 25° C.). A 6.0 wt % solids solution ("solution B") was prepared by the same procedure except that 2732 mL of THF and 1488 mL of water were used.

The solutions were coated onto one side of a 12 μm thick and 280 mm wide, PET film using a 28 cm wide, continuous doctor roll coating system (1) shown in the Figure. The film (2) was pulled from supply roll (4) and redirected by roll (6). The film was pulled in the gap (8) between two, 6.35 cm diameter, counter-rotating rolls (10) and (12) turning at the same surface velocity as the film speed. A pan (14) containing the coating solution (16) was placed beneath roll (12) to partially immerse the roll and causing it to apply coating solution at room temperature to one side of the film. The coating thickness was determined by the size of the gap. The coated film was then passed through a 2.3 m long, hot air convection drier (18), heated by means not shown, in which solvent was removed. The dried film was wound up outside the drier with directional rollers (20), (22) and (24), and wind-up roller (26), then tested for haze, residual THF content and oxygen barrier properties. Rollers (10), (12) and (26) were driven in the directions indicated by the arrows, by conventional means not shown. Operating conditions and test results are summarized in Table III.

Films of this invention were much clearer and appeared better than the comparative films which had higher haze levels and many very small surface blisters observed by visual inspection. Barrier properties of the films according to this invention were also better than the comparative example films. At both 40% and 80% relative humidity, the comparative films had higher oxygen transmission rates (OTR). Oxygen permeation values (OPV) for unit thickness of coating were calculated using an OTR value of 140 mL/m².day·atm for the uncoated, PET film. OPV of operative example coatings were universally lower than the comparative coatings except that at 80% relative humidity, Example 15 OPV (141 mL·μm/m².day·atm) exceeded the OPV of Example C10 (123 mL·μm/m².day·atm). These results are believed attributable to the combination of drying time and temperature and coating thickness conditions. More specifically, relative to C10, Example 15 had much shorter drying time at about the same drying temperature, and greater coating thickness. Residual THF of less than 150 mg/m² was measured in the dried coatings. Such amounts should not detract from the usefulness of coated films of this invention.

EXAMPLE 17

A surface of a 23 μm thick PET film was primed with about 0.3 μm adhesive layer of ethylene/vinyl acetate copolymer containing 28% vinyl acetate and grafted with 0.3% maleic anhydride. The adhesive was coated from a 12% solution in 50/50 toluene/THF solvent by a gravure method using a No. 110 quad-cell cylinder and convection air oven drying at 107° C. The primed film was top-coated with solution A according to the procedure of Example 12, except that coating speed was 0.18 m/s, average drier air temperature was 118° C. and drying time was 13 seconds. A dry EVOH coating of 1.7 μm thickness, having good appearance and 18% haze was obtained. The EVOH side of a strip of coated film was laminated to a pressure sensitive tape. The tape and film were subjected to a "T" peel strength test at 2 cm/min. which indicated good adhesion between the EVOH and PET substrate of 20 g/cm.

EXAMPLE 18

A 2.6 μm dry thickness top layer was coated on the aluminum surface layer of a metallized-PET film (DuPont Mylar ® 48MM20) using solution A according to the procedure of Example 12 except that coating speed was 0.25 m/s, average drier air temperature was 115° C. and drying time was 9 seconds. The OTR at 80% relative humidity improved from 2.8 mL/m².day·atm for the uncoated, metallized-film to 0.84 mL/m².day·atm for the EVOH-coated film. Both uncoated and coated films were subjected to Gelbo flexing for 10 cycles after which oxygen transmission rate was again measured. The OTR of the EVOH-coated film only deteriorated by a factor of 3.2 to 2.7 mL/m².day·atm while the un-

TABLE III

| Example No. | Solids in solution Wt % | Film Speed m/s | Drying Time Sec. | Drying Temp. Avg. °C. | Coating Thickness μm | Haze (3) % | OTR (1) 40% RH | OTR (1) 80% RH | OPV (2) 40% RH | OPV (2) 80% RH |
|---|---|---|---|---|---|---|---|---|---|---|
| 14 | 9.7 | 0.18 | 13 | 119 | 2.2 | 8.7 | 6.0 | 28.8 | 14 | 80 |
| 15 | 9.7 | 0.41 | 6 | 119 | 2.9 | 8.4 | 6.2 | 36.7 | 18 | 141 |
| 16 | 9.7 | 0.20 | 11 | 103 | 2.6 | 8.2 | 6.8 | 34.1 | 17 | 106 |
| C10 | 6.0 | 0.18 | 13 | 116 | 2.0 | 42.8 | 12.4 | 42.7 | 27 | 123 |
| C11 | 6.0 | 0.25 | 9 | 115 | 1.9 | 42.5 | 16.3 | 54.8 | 35 | 173 |
| C12 | 6.0 | 0.38 | 6 | 100 | 1.2 | 60.2 | 16.2 | 70.1 | 23 | 176 |

(1) Coated-film oxygen transmission rate mL/m² · day · atm at 40% and 80% relative humidity (RH)
(2) EVOH oxygen permeability value, mL · μm/m² · day · atm at 40% and 80% RH
(3) Hunterlab ColorQuest Sphere Spectro-Colorimeter, Version 3.2 coated, metallized-film rate deteriorated 7.4 times to 20.8 mL/m²·day·atm.

EXAMPLE 19

Solution A was applied to one surface of a 20 μm thick, nylon film available under the tradename "Dartek"-130. The procedure of Example 12 was used with coating speed of 0.25 m/s, average drier air temperature of 115° C. and drying time of 9 seconds to produce a dry coating of 2.3 μm thickness.

The oxygen transmission rates of the coated nylon film at 42% and 80% relative humidity were 4.5 and 33 mL/m²·day·atm, respectively. By comparison, the transmission rates for the uncoated nylon film were 40 and 82 mL/m²·day·atm, respectively. The oxygen permeability values of the EVOH layer at 42% and 80% relative humidity were calculated to be 11 and 110 mL·μm/m²·day·atm, respectively.

I claim:

1. A process for solution coating a substrate with an ethylene/vinyl alcohol copolymer (EVOH) barrier, comprising the steps of:
   (1) agitating a coating solution consisting essentially of
      (A) about 7 to about 20 wt % ethylene/vinyl alcohol copolymer having copolymerized ethylene content from about 20 to about 55 mole %; and
      (B) a complementary amount to total to 100 wt % of a solvent consisting essentially of about 10 to about 70 wt % water; and a complementary amount to total 100 wt % of tetrahydrofuran;
   at a temperature within the range of about 55°–100° C. until a clear solution is obtained;
   (2) coating at least one surface of the substrate with the coating solution; and
   (3) removing the solvent, whereby a dry ethylene/vinyl alcohol copolymer coating on the at least one surface is produced.

2. A process of claim 1 wherein the ethylene/vinyl alcohol copolymer is about 8 to about 14 wt % of the coating solution.

3. A process of claim 1 wherein the solvent consists essentially of water present in weight percent concentration of at least about 65 minus the mole percent copolymerized ethylene content of the ethylene/vinyl alcohol copolymer, and at most about 90 minus the mole percent copolymerized ethylene content of the ethylene/vinyl alcohol copolymer; and a complementary amount to total to 100 weight percent of tetrahydrofuran.

4. A process of claim 1 wherein the at least one surface of the substrate is selected from the group consisting of polyester, polyamide, regenerated cellulosic film, metal-coated polyester and paper.

5. A process of claim 4 wherein the polyester is polyethylene terephthalate.

* * * * *